(12) United States Patent
Shao et al.

(10) Patent No.: US 12,125,003 B2
(45) Date of Patent: Oct. 22, 2024

(54) METHODS AND INTERNET OF THINGS (IOT) SYSTEMS FOR SMART GAS PIPELINE MAINTENANCE BASED ON HUMAN-MACHINE LINKAGE

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Xiaojun Wei, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/422,260

(22) Filed: Jan. 25, 2024

(65) Prior Publication Data
US 2024/0202672 A1    Jun. 20, 2024

(30) Foreign Application Priority Data
Dec. 18, 2023   (CN) .......................... 202311734220.2

(51) Int. Cl.
*G06Q 10/20* (2023.01)
*F17D 5/02* (2006.01)
(Continued)

(52) U.S. Cl.
CPC .............. *G06Q 10/20* (2013.01); *F17D 5/02* (2013.01); *G05D 1/617* (2024.01);
(Continued)

(58) Field of Classification Search
CPC .... G06Q 10/20; G06Q 10/0635; G06Q 50/06; F17D 5/02; G05D 1/617; G05D 2101/15;
(Continued)

(56) References Cited

FOREIGN PATENT DOCUMENTS

| CN | 102081765 A | 6/2011 |
|---|---|---|
| CN | 103426061 B | 3/2017 |

(Continued)

OTHER PUBLICATIONS

Chen, Wei et al., Assessment of Condition-based Maintenance for an UAV System, Journal of Chongqing University of Technology(Natural Science), 28(1): 102-104&138, 2014.
(Continued)

*Primary Examiner* — Basil T. Jos
(74) *Attorney, Agent, or Firm* — METIS IP LLC

(57) ABSTRACT

Methods and Internet of Things (IOT) systems for smart gas pipeline maintenance based on human-machine linkage are provided. The IoT system includes a smart gas user platform, a smart gas service platform, a smart gas pipeline network safety management platform, a smart gas pipeline network sensor network platform, and a smart gas pipeline network object platform. The method includes determining a first cycle based on data of a pipeline to be maintained, a feature of a maintainer, and/or a feature of a maintenance robot, obtaining, through a maintainer terminal and/or the maintenance robot, first feedback data based on the first cycle, determining, based on the first feedback data and the data of the pipeline to be maintained, a maintenance parameter and sending the maintenance parameter to the maintainer terminal, and generating, based on the maintenance parameter, a control instruction and sending the control instruction to the maintenance robot.

8 Claims, 5 Drawing Sheets

(51) Int. Cl.
*G05D 1/617* (2024.01)
*G06Q 10/0635* (2023.01)
*G16Y 10/35* (2020.01)
*G16Y 40/10* (2020.01)
*F16L 55/26* (2006.01)
*G05D 101/15* (2024.01)
*G05D 105/45* (2024.01)
*G05D 107/50* (2024.01)
*G06Q 50/06* (2012.01)

(52) U.S. Cl.
CPC .......... *G06Q 10/0635* (2013.01); *G16Y 10/35* (2020.01); *G16Y 40/10* (2020.01); *F16L 55/26* (2013.01); *G05D 2101/15* (2024.01); *G05D 2105/47* (2024.01); *G05D 2107/50* (2024.01); *G06Q 50/06* (2013.01)

(58) Field of Classification Search
CPC .......... G05D 2105/47; G05D 2107/50; G16Y 10/35; G16Y 40/10; F16L 55/26; G06F 18/214; G06F 18/23; G06N 3/042
See application file for complete search history.

(56) References Cited

FOREIGN PATENT DOCUMENTS

| | | | |
|---|---|---|---|
| CN | 106600095 | A | 4/2017 |
| CN | 110348583 | A | 10/2019 |
| CN | 111682447 | A | 9/2020 |
| CN | 112712148 | A | 4/2021 |
| CN | 113467477 | A | 10/2021 |
| CN | 113486494 | A | 10/2021 |
| CN | 115358432 | A | 11/2022 |
| CN | 115660647 | A | 1/2023 |
| CN | 115796847 | A | 3/2023 |
| CN | 116025803 | A * | 4/2023 |

OTHER PUBLICATIONS

Liu, Zengyong et al., Risk Identification of Maintenance Support for Integrated Military and Civilian Equipment, Journal of Sichuan Ordnance, 2012, 6 pages.

Guo, Xuanhong et al., UAV is Applied to Maintenance of Optical Cable in Oil Field, Science & Technology Industry Parks, 2018, 2 pages.

Ana Carolina Cardoso De Sousa et al., Sensors in Reconfigurable Modular Robot for Pipeline Inspection: Design and tests of a Prototype, 2014 Joint Conference on Robotics: SBR-LARS Robotics Symposium and Robocontrol, Jul. 12, 2014.

First Office Action in Chinese Application No. 202311734220.2 mailed on Feb. 6, 2024, 13 pages.

Notification to Grant Patent Right for Invention in Chinese Application No. 202311734220.2 mailed on Feb. 29, 2024, 4 pages.

First Office Action in Chinese Application No. 202311734220.2 mailed on Feb. 6, 2024, 12 pages.

* cited by examiner

200

210 — Determining a first cycle based on data of a pipeline to be maintained, a feature of a maintainer, and/or a feature of a maintenance robot 220 — Obtaining, through a maintainer terminal and/or the maintenance robot, first feedback data based on the first cycle 230 — Determining, based on the first feedback data and the data of the pipeline to be maintained, a maintenance parameter and sending the maintenance parameter to the maintainer terminal 240 — Generating, based on the maintenance parameter, a control instruction and sending the control instruction to the maintenance robot

METHODS AND INTERNET OF THINGS (IOT) SYSTEMS FOR SMART GAS PIPELINE MAINTENANCE BASED ON HUMAN-MACHINE LINKAGE

CROSS-REFERENCE TO RELATED APPLICATION

This application claims priority to Chinese Patent Application No. 202311734220.2, filed on Dec. 18, 2023, the entire contents of which are hereby incorporated herein by reference.

TECHNICAL FIELD

The present disclosure relates to the field of gas, and in particular, to methods and Internet of Things (IOT) systems for smart gas pipeline maintenance based on human-machine linkage.

BACKGROUND

Maintenance of a gas pipeline are usually performed by maintainers and maintenance robots. In the prior art, there are mostly manners involving only maintenance devices or maintenance robots, and there is a lack of a maintenance and management mean when the maintainer controls the maintenance robot to work together. In CN112712148A, a method, system, device, and storage medium for monitoring an underground pipeline network is proposed, which include inspecting a pipeline by a robot, and when an abnormality is found, prompting a maintainer to carry out maintenance. In the above invention, when the maintainer maintains a faulty pipeline, there may be a situation in which the maintainer is unable to complete, and the robot needs to intervene due to a relatively high risk. At this time, the robot is mobilized to move in for maintenance, which makes the maintenance work progress slow and even delays the maintenance time, thereby resulting in losses.

Therefore, the present disclosure provides methods and Internet of Things (IOT) systems for smart gas pipeline maintenance based on human-machine linkage, which improves gas maintenance efficiency and safety.

SUMMARY

One or more embodiments of the present disclosure provide an Internet of Things (IoT) system for smart gas pipeline maintenance based on human-machine linkage. The IoT system may include a smart gas user platform, a smart gas service platform, a smart gas pipeline network safety management platform, a smart gas pipeline network sensor network platform, and a smart gas pipeline network object platform. The smart gas pipeline network safety management platform is configured to determine a first cycle based on data of a pipeline to be maintained, a feature of a maintainer, and/or a feature of a maintenance robot, obtain, through a maintainer terminal and/or the maintenance robot, first feedback data based on the first cycle, determine, based on the first feedback data and the data of the pipeline to be maintained, a maintenance parameter and send the maintenance parameter to the maintainer terminal, and generate, based on the maintenance parameter, a control instruction and send the control instruction to the maintenance robot.

One or more embodiments of the present disclosure provide a method for smart gas pipeline maintenance based on human-machine linkage, implemented by a smart gas pipeline network safety management platform of an Internet of Things (IOT) system for smart gas pipeline maintenance based on human-machine linkage. The method comprises: determining a first cycle based on data of a pipeline to be maintained, a feature of a maintainer, and/or a feature of a maintenance robot; obtaining, through a maintainer terminal and/or the maintenance robot, first feedback data based on the first cycle; determining, based on the first feedback data and the data of the pipeline to be maintained, a maintenance parameter and send the maintenance parameter to the maintainer terminal; and generating, based on the maintenance parameter, a control instruction and sending the control instruction to the maintenance robot.

One or more embodiments of the present disclosure provide a non-transitory computer-readable storage medium storing computer instructions. When reading the computer instructions in the storage medium, a computer executes the method for smart gas pipeline maintenance based on human-machine linkage.

BRIEF DESCRIPTION OF THE DRAWINGS

The present disclosure will be further illustrated by way of exemplary embodiments. These exemplary embodiments will be described in detail by way of drawings. These embodiments are non-limiting exemplary embodiments, in which like reference numerals represent similar structures, wherein:

FIG. 2 is a flowchart illustrating an exemplary process for smart gas pipeline maintenance based on human-machine linkage according to some embodiments of the present disclosure;

DETAILED DESCRIPTION

Figure 1:
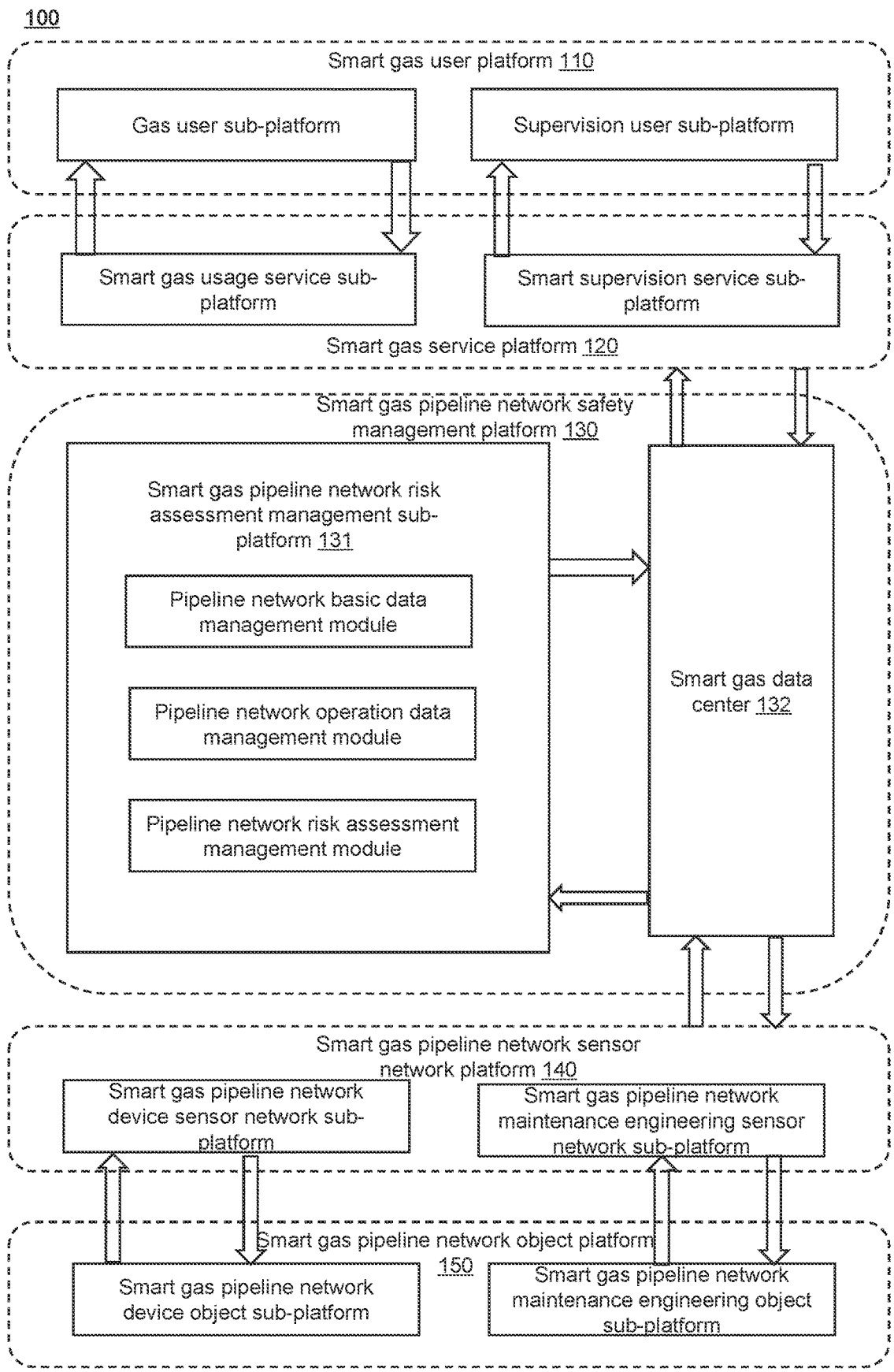
FIG. 1 is a structural diagram illustrating an Internet of Things (IOT) system for smart gas pipeline maintenance based on human-machine linkage according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

The maintenance of a gas pipeline fault is complex and varied. In CN112712148A, it is only proposed that a robot inspects the pipeline and reports when an abnormal situation is found, but has no maintenance function. Moreover, a maintainer is usually unable to further maintain a faulty pipeline in a timely manner in relatively dangerous situations. Therefore, some embodiments of the present disclosure propose Internet of Things (IOT) systems for smart gas pipeline maintenance based on human-machine linkage. The IoT system generates a corresponding control instruction by the maintainer and/or a maintenance robot continuously collecting feedback data of the faulty pipeline and take appropriate countermeasures against the faulty pipeline.

FIG. 1 is a structural diagram illustrating an Internet of Things (IOT) system for smart gas pipeline maintenance based on human-machine linkage according to some embodiments of the present disclosure. The Internet of Things (IOT) system for smart gas pipeline maintenance based on human-machine linkage involved in some embodiments of the present disclosure is described in detail as follows. It should be noted that the following embodiments are merely provided for purpose of illustration and is not intended to constitute a limitation of the present disclosure.

In some embodiments, the Internet of Things (IOT) system 100 for smart gas pipeline maintenance based on human-machine linkage may including a smart gas user platform 110, a smart gas service platform 120, a smart gas pipeline network safety management platform 130, a smart gas pipeline network sensor network platform 140, and a smart gas pipeline network object platform 150.

In some embodiments, the smart gas user platform 110 refers to a platform for interacting with a user.

In some embodiments, the smart gas user platform 110 includes a gas user sub-platform and a supervision user sub-platform. The gas user sub-platform may provide a gas user with data related to gas usage and solutions to gas problems. The gas user may be an industrial gas user, a commercial gas user, an ordinary gas user, etc. The supervision user sub-platform refers to a platform for the supervision user to supervise the operation of the entire IoT system. The supervision user may be a member of a security management department.

The smart gas service platform 120 refers to a platform used to convey the need and control information of the user.

In some embodiments, the smart gas service platform 120 includes a smart gas usage service sub-platform and a smart supervision service sub-platform. The smart gas usage service sub-platform refers to a platform that provides a gas service to the gas user. The smart supervision service sub-platform refers to a platform that provides a supervision need for the supervision user.

The smart gas pipeline network safety management platform 130 refers to a platform that coordinates or plans a connection and a collaboration between various functional platforms as a whole, gathers information of the Internet of Things, and provides perception management and control management functions for an operation system of the Internet of Things. In some embodiments, the smart gas pipeline network safety management platform may determine a first cycle, a maintenance parameter, and generate a control instruction.

In some embodiments, the smart gas pipeline network safety management platform 130 includes a smart gas pipeline network risk assessment management sub-platform 131 and a smart gas data center 132. The smart gas pipeline network risk assessment management sub-platform may be used to assess a pre-maintenance risk. In some embodiments, the smart gas pipeline network risk assessment management sub-platform may include, but is not limited to, a pipeline network basic data management module, a pipeline network operation data management module, and a pipeline network risk assessment management module. The smart gas data center may be used to store all operational information of the Internet of Things (IOT) system 100 for smart gas pipeline maintenance based on human-machine linkage. In some embodiments, the smart gas data center may be configured as a storage device for storing data related to pipeline maintenance, etc.

In some embodiments, the smart gas pipeline network safety management platform 130 may interact with the smart gas service platform 120 and the smart gas pipeline network sensor network platform 140 through the smart gas data center, respectively.

In some embodiments, data of a pipeline to be maintained may be sent to a maintainer terminal by the smart gas pipeline network safety management platform 130 and sent to a pipeline network maintenance engineering object sub-platform via a smart gas pipeline network maintenance engineering sensor network sub-platform.

In some embodiments, the smart gas pipeline network sensor network platform 140 refers to a functional platform for managing sensor communications. In some embodiments, the smart gas pipeline network sensor network platform 140 may perform functions of perceptual information sensor communication and control information sensor communication.

In some embodiments, the smart gas pipeline network sensor network platform 140 may include a smart gas pipeline network device sensor network sub-platform and the smart gas pipeline network maintenance engineering sensor network sub-platform, which are respectively used to obtain operational information of a gas indoor device and a gas pipeline network device.

The smart gas pipeline network object platform 150 refers to a functional platform for generating perceptual information and executing control information.

In some embodiments, the smart gas pipeline network object platform 150 may include a smart gas pipeline network device object sub-platform, and a smart gas pipeline network maintenance engineering object sub-platform. In some embodiments, the smart gas pipeline network device object sub-platform may be configured to be connected to a maintenance robot. The smart gas pipeline network maintenance engineering object sub-platform may be configured to be connected to the maintainer terminal.

The maintainer terminal refers to a device that may perform data transmission and processing functions. The maintainer terminal may include a screen and a processor.

The maintainer may achieve functions such as data uploading, receiving, or information interaction through the maintainer terminal. The maintenance robot refers to a robot that may perform data transmission and processing and execute the maintenance operation of the gas pipeline. In some embodiments, the data transmission and processing include obtaining, receiving, processing, and sending transmission data, such as uploading the data of the pipeline to be maintained. In some embodiments of the present disclosure, the Internet of Things (IOT) system 100 for smart gas pipeline maintenance based on human-machine linkage may form a closed-loop information operation between the smart gas pipeline network object platform 150 and the smart gas user platform 110 and achieve coordinated and regular operation under the unified management of the smart gas pipeline network safety management platform 130, thereby realizing the informatization and intelligence of the Internet of Things (IOT) system for smart gas pipeline maintenance based on human-machine linkage.

It should be understood that the system and its modules illustrated in FIG. 1 may be implemented in various ways.

It should be noted that the descriptions of the Internet of Things (IOT) system for smart gas pipeline maintenance based on human-machine linkage and modules thereof are merely provided for convenience of illustration, and does not limit the present disclosure to the scope of the embodiments. It should be understood that for those skilled in the art in this field, after understanding the principle of the system, it is possible to arbitrarily combine various modules or form a sub-system connected with other modules without departing from the principle. In some embodiments, the smart gas user platform 110, the smart gas service platform 120, the smart gas pipeline network safety management platform 130, the smart gas pipeline network sensor network platform 140, and the smart gas pipeline network object platform 150 disclosed in FIG. 1 may be different modules within a system, or may be a module realizing the functions of two or more of the above modules. For example, the various modules may share a storage module, and each module may have its own storage module. Such variations still remain within the scope of protection of the present disclosure.

FIG. 2 is a flowchart illustrating an exemplary process for smart gas pipeline maintenance based on human-machine linkage according to some embodiments of the present disclosure. As shown in FIG. 2, the process 200 includes the following operations. In some embodiments, the process 200 may be implemented by a smart gas pipeline network safety management platform.

In 210, determining a first cycle based on data of a pipeline to be maintained, a feature of a maintainer, and/or a feature of a maintenance robot.

The data of the pipeline to be maintained refers to data related to a gas pipeline after a fault occurs. In some embodiments, the data of the pipeline to be maintained at least includes a fault type, fault data, a degree of importance of the pipeline to be maintained, and a recommended maintenance manner.

In some embodiments, the data of the pipeline to be maintained may be obtained by the maintainer and/or the maintenance robot from a smart gas pipeline network object platform. More descriptions regarding the obtaining the data of the pipeline to be maintained may be found in FIG. 1 and the related descriptions thereof.

The feature of a maintainer refers to a relevant feature of the maintainer with respect to pipeline maintenance. For example, the feature of a maintainer may include a count of years of working of the maintainer, a degree of proficiency of the maintainer, or a degree to which maintenance skills of the maintainer match a current pipeline problem.

The feature of a maintenance robot refers to an attribute, a performance, etc., of the maintenance robot itself. For example, the feature of a maintenance robot may include a maintenance ability, a service life, a power, a material, etc., of the maintenance robot.

The first cycle refers to a cycle corresponding to obtaining first feedback data.

The first cycle is mainly related to a maintenance ability, a feedback habit of the maintainer, and the maintenance ability of the maintenance robot. The stronger the maintenance abilities of the maintainer and the maintenance robot, and the more ideal the feedback habit of the maintainer, the shorter the length of the first cycle. The weaker the maintenance abilities of the maintainer and the maintenance robot, and the less ideal the feedback habit of the maintainer, the longer the length of the first cycle. The stronger the maintenance abilities is, the shorter the maintenance time, and/or the higher the maintenance success rate in the case of a same pipeline fault. The more ideal the feedback habit is, the more timely and accurate feedback may be given on maintenance during the pipeline maintenance.

In some embodiments, the smart gas pipeline network safety management platform may determine the first cycle in a first database based on the data of the pipeline to be maintained, the feature of the maintainer, and/or the feature of the maintenance robot through a vector matching manner.

In some embodiments, the smart gas pipeline network safety management platform may construct a vector to be matched based on the data of the pipeline to be maintained, the feature of the maintainer, and/or the feature of the maintenance robot. The first database includes a plurality of reference vectors. Each reference vector of the plurality of reference vectors corresponds to a first cycle.

In some embodiments, the historical maintenance feedback data set includes a plurality of pieces of historical maintenance feedback data. The smart gas pipeline network safety management platform may cluster the plurality of pieces of historical maintenance feedback data, determine at least one clustering center based on a clustering algorithm, obtain a first clustering center set corresponding to the data of the pipeline to be maintained, various maintainers, and various maintenance robots, and construct, based on the first clustering center set, the plurality of reference vectors. Each clustering center corresponds to a reference vector.

The reference vector is constructed in a way similar to the way in which the vector to be matched is constructed.

In some embodiments, the smart gas pipeline network safety management platform may determine the first cycle based on a plurality of similarities between the vector to be matched and the plurality of reference vectors in the first database. For example, the smart gas pipeline network safety management platform determines a reference vector whose similarity with the vector to be matched satisfies a first preset condition as a target vector and determines a first cycle corresponding to the target vector as the first cycle. The first preset condition may be set according to a specific situation. For example, the condition may include that the similarity is largest, the similarity is greater than a threshold, etc.

In 220, obtaining, through a maintainer terminal and/or the maintenance robot, first feedback data based on the first cycle.

The first feedback data refers to data about the maintenance of a faulty pipeline. The first feedback data includes maintainer feedback data and robot feedback data.

The maintainer feedback data refers to feedback provided by the maintainer after observing the faulty pipeline. For example, the maintainer feedback data includes whether the faulty pipeline may be maintained manually, a degree of difficulty assessed manually, a maintenance risk assessed manually, and an estimated maintenance time. The assessment of maintenance risk is mainly a judgment performed by the maintainer on the faulty pipeline based on the experience of the maintainer.

The robot feedback data refers to feedback provided by the robot after surveying the faulty pipeline. For example, the robot feedback data includes whether the faulty pipeline may be maintained by the robot, a plate that is assessed to be maintainable, the estimated maintenance time, and a maintenance risk.

In some embodiments, the smart gas pipeline network safety management platform may obtain, through the maintainer and the maintenance robot, the first feedback data based on the first cycle, know the fault condition and a degree of danger of the faulty pipeline, and determine whether the faulty pipeline may be maintained by the maintainer or the maintenance robot alone, or through cooperation between the maintainer and the maintenance robot.

In some embodiments, the smart gas network safety management platform determines a fault level based on the data of the pipeline to be maintained and determine a pre-maintenance risk based on the fault level and the first feedback data.

The fault level refers to a degree of damage to the faulty pipeline. In some embodiments, the fault level is indicated by g1, g2, g3, etc.

In some embodiments, the smart gas pipeline network safety management platform determines the fault level by querying a first preset table based on the data of the pipeline to be maintained. The first preset table is constructed based on historical pipeline maintenance data and the fault level.

The pre-maintenance risk refers to a degree of risk assessed before the faulty pipeline is maintained. When the degree of risk is relatively large, the maintainer needs to control the maintenance robot to maintain the faulty pipeline.

In some embodiments, the smart gas pipeline network safety management platform determines the pre-maintenance risk by querying a second preset table based on the fault level and the first feedback data. The second preset table is constructed based on the fault level, the first feedback data, and the maintenance risk.

In some embodiments, the smart gas pipeline network safety management platform determines the pre-maintenance risk in a second database through vector matching based on the fault level and the first feedback data.

In some embodiments, the smart gas pipeline network safety management platform constructs a vector to be matched based on the fault level and the first feedback data. The second database includes a plurality of reference vectors. Each reference vector of the plurality of reference vectors corresponds to a maintenance risk.

In some embodiments, the smart gas pipeline network safety management platform clusters a plurality of pieces of historical maintenance feedback data, determines at least one clustering center based on a clustering algorithm, obtain a second clustering center set corresponding to the fault level and the first feedback data, and construct, based on the second clustering center set, the reference vector. The reference vector is constructed in a way similar to the way in which the vector to be matched is constructed.

In some embodiments, the smart gas pipeline network safety management platform may determine the pre-maintenance risk based on a plurality of similarities between the vector to be matched and the plurality of reference vectors in the second database. For example, the smart gas pipeline network safety management platform determines a reference vector whose similarity with the vector to be matched satisfies a second preset condition as a target vector and determines a maintenance risk corresponding to the target vector as the pre-maintenance risk. The second preset condition may be set according to a specific situation. For example, the second preset condition may include that the similarity is largest, the similarity is greater than a threshold, etc.

In some embodiments of the present disclosure, the pre-maintenance risk may be efficiently determined based on the fault level and the first feedback data through the vector matching, which lays the foundation for the smart gas pipeline network safety management platform to rapidly determine the maintenance parameter in the maintenance process.

In some embodiments of the present disclosure, the pre-maintenance risk may be assessed, the fault condition that may occur in the faulty pipeline may be predicted and classified, and a reasonable plan may be formulated, which ensures the safety of the maintainer and the advancement of the maintenance progress.

In some embodiments, the smart gas pipeline network safety management platform may adjust the pre-maintenance risk based on a post-maintenance risk.

The pre-maintenance risk also includes whether a purpose of the maintenance may be achieved. The purpose of the maintenance includes that the maintained gas pipeline meets a corresponding safety standard for use. The purpose of the maintenance is related to the post-maintenance risk. In some embodiments, the purpose of the maintenance of a gas pipeline is positively correlated with the post-maintenance risk corresponding to the gas pipeline. For example, the higher the post-maintenance risk, the more stringent the requirement for the maintained gas pipeline to meet the safety standard for use. For example, if a risk of bursting after maintenance of an aging pipeline segment A is relatively high, the maintenance manner of the pipeline segment A may be to replace the pipeline body of the pipeline segment A to make it fully meets the safety standard for use corresponding to the purpose of the maintenance.

The post-maintenance risk refers to a degree of risk determined by assessing the maintenance situation of the faulty pipeline after the faulty pipeline is maintained. For example, the post-maintenance risk may include whether the maintained pipeline leaks and whether surrounding pipelines function normally.

The post-maintenance risk is determined based on gas pipeline data obtained by the smart gas object platform, the data of the pipeline to be maintained, and a candidate maintenance parameter. More descriptions regarding the determining the post-maintenance risk may be found in FIG. 5 and related descriptions thereof.

In some embodiments, the pre-maintenance risk may be obtained by weighting the pre-maintenance risk obtained from a risk degree assessment model and the post-maintenance risk. For example, the pre-maintenance risk=W1*pre-maintenance risk obtained from the risk degree assessment model+W2*post-maintenance risk. W1 and W2 denote pre-set weights. W1 and W2 are related to a degree of importance of the pipeline to be maintained, which may be determined based on the data of the pipeline to be maintained. The degree of importance of the pipeline to be maintained is negatively correlated with a ratio of W1 to W2, that is, the higher the degree of importance, the larger the W2. Descriptions regarding the risk degree assessment model may be found in FIG. 3 and the related descriptions thereof.

In some embodiments of the present disclosure, a final pre-maintenance risk is calculated by weighting the pre-maintenance risk obtained from the risk degree assessment model and the predicted post-maintenance risk, which predicts the pre-maintenance risk more reasonably and efficiently.

In 230, determining, based on the first feedback data and the data of the pipeline to be maintained, a maintenance parameter and sending the maintenance parameter to the maintainer terminal.

The maintenance parameter refers to work that the maintainer needs to complete and work that needs to be completed by controlling the maintenance robot. The maintenance parameter at least includes a parameter for the maintainer to maintain the pipeline to be maintained. For example, the maintenance parameter may include a diameter length of a replacement pipeline, a type of the pipeline, a length of a strap, etc.

The smart gas pipeline network safety management platform may determine the maintenance parameter based on the first feedback data and the data of the pipeline to be maintained in various ways. For example, the smart gas pipeline network safety management platform may determine the maintenance parameter by querying a third preset table based on the first feedback data and the data of the pipeline to be maintained. The third preset table is constructed based on the first feedback data, the data of the pipeline to be maintained, and the maintenance parameter.

After the maintenance parameter is determined, the maintenance parameter is sent to the maintainer terminal of the smart gas pipeline network maintenance engineering object sub-platform via the smart gas pipeline network maintenance engineering sensor network sub-platform.

In 240, generating, based on the maintenance parameter, a control instruction and sending the control instruction to the maintenance robot.

The control instruction refers to an instruction generated by the smart gas pipeline network safety management platform based on the maintenance parameter to control the robot to maintain the pipeline.

When determining that the faulty pipeline may be maintained, the smart gas pipeline network safety management platform sends the control instruction to the smart gas pipeline network device object sub-platform via the smart gas pipeline network device sensor network sub-platform to control the maintenance robot to maintain the faulty pipeline.

In some embodiments of the present disclosure, the maintenance parameter is determined based on the first feedback data and the data of the pipeline to be maintained, and the maintenance parameter is sent to the maintainer and the maintenance robot simultaneously, so that the maintainer and the maintenance robot may jointly perform an operation such as maintenance on the faulty pipeline, which not only ensures personnel safety, but also improves maintenance efficiency and reduces maintenance time to a certain extent.

Figure 3:
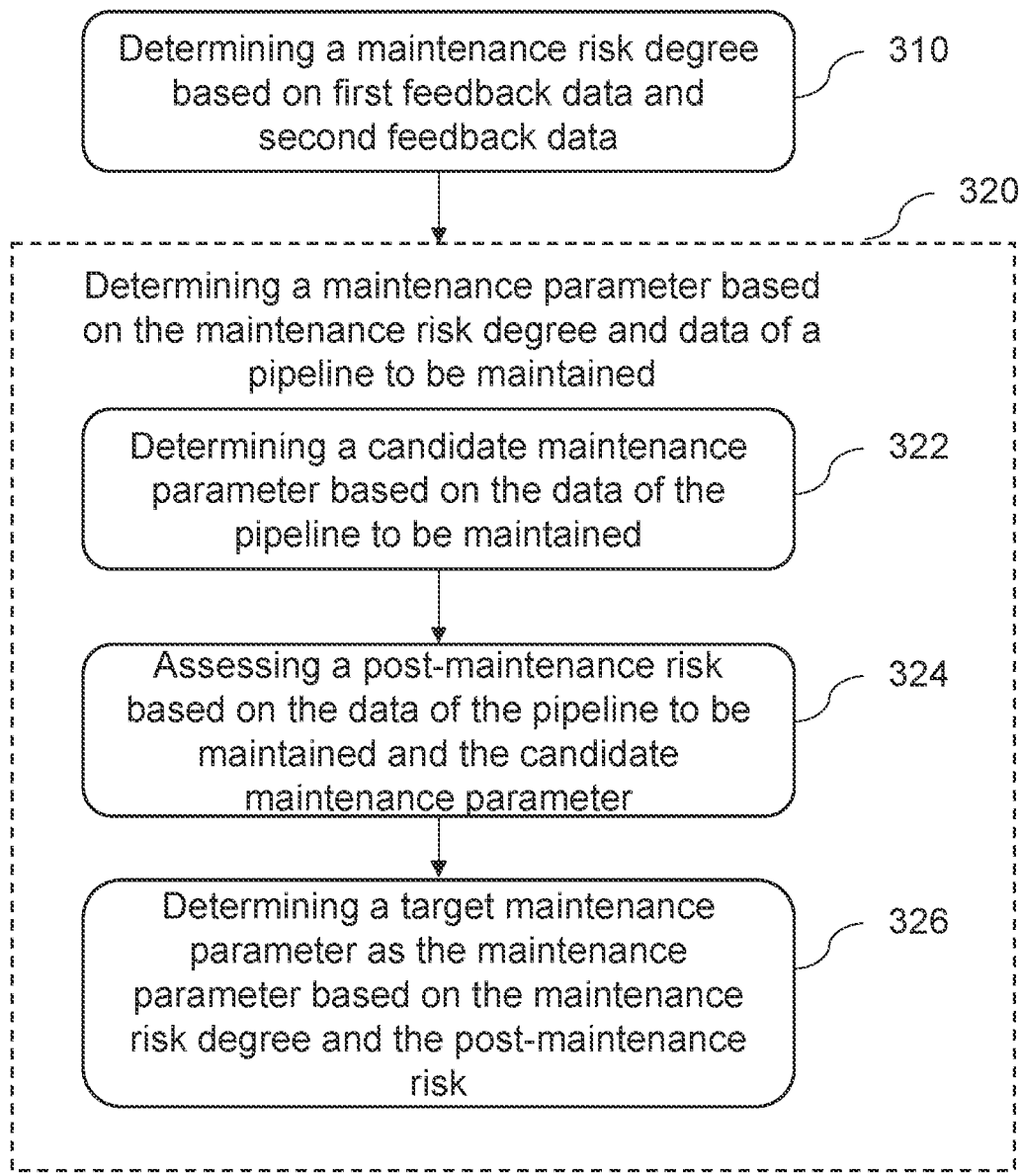
FIG. 3 is a flowchart illustrating an exemplary process for determining a maintenance parameter according to some embodiments of the present disclosure.

FIG. 3 is a flowchart illustrating an exemplary process for determining a maintenance parameter according to some embodiments of the present disclosure.

In 310, determining a maintenance risk degree based on first feedback data and second feedback data.

In some embodiments, the maintenance parameter is also related to the second feedback data. For example, a smart gas pipeline network safety management platform may update the maintenance parameter based on the second feedback data obtained in real time in the maintenance process.

The second feedback data refers to data collected in the maintenance process. In some embodiments, the second feedback data is obtained by a maintenance robot based on a second cycle. The second cycle refers to a cycle in which the maintenance robot collects the second feedback data. For example, if the second cycle is 30 minutes, the maintenance robot collects the second feedback data every 30 minutes.

In some embodiments, the second feedback data may include pipeline data detected by an environmental sensor detection sub-module of the maintenance robot, a maintenance plate, a maintenance progress, and an estimated maintenance time. The pipeline data may include a pipeline pressure, a pipeline temperature, an environmental temperature, a gas concentration around the pipeline, etc. The maintenance plate refers to specific maintenance, such as screwing screws or reinforcing pipelines.

The maintenance risk degree refers to a risk change value of a maintenance parameter in a current maintenance process compared with the pre-maintenance, which is used to assess whether a changed risk supports further maintenance.

In some embodiments, the smart gas pipeline network safety management platform may determine the maintenance risk degree based on the first feedback data and the second feedback data in various ways. For example, the smart gas pipeline network safety management platform may determine the maintenance risk degree by querying a fourth preset table based on the first feedback data and the second feedback data. The fourth preset table is constructed based on the first feedback data, the second feedback data, and the maintenance risk degree.

In some embodiments, the smart gas pipeline network safety management platform may determine the maintenance risk degree using a risk degree assessment model based on the first feedback data and the second feedback data.

In some embodiments, the risk degree assessment model may be a machine learning model. For example, the risk degree assessment model may be a neural network model. In some embodiments, an input of the risk degree assessment model may include the first feedback data and the second feedback data, and an output of the risk degree assessment model may be the maintenance risk degree.

In some embodiments, the risk degree assessment model may be trained. A first training sample includes the first feedback data, the second feedback data in historical maintenance data, and a first label may be the maintenance risk degree in a historical maintenance process corresponding to the first training sample.

In some embodiments, the maintenance risk degree (denoted as R) used as the training label may be determined by weighting pipeline changes:

$R = k_1 * R_1 + k_2 * R_2 + k_3 * R_3$, where $k_i$ ($i=1,2,3$, the same below) denotes a weighting coefficient that may be preset by a technician according to experience, and R1, R2, and R3 denote a first risk, a second risk, and a third risk, respectively. R1, R2, and R3 may be determined using the following equations:

$R_1 = $(Gas concentration around the pipeline—Hazard threshold 1)/Hazard threshold 1.

$R2 = (\text{Pipeline pressure} - \text{Hazard threshold 2})/\text{Hazard threshold 2}.$ $R3 = (\text{Pipeline temperature} - \text{Hazard threshold 3})/\text{Hazard threshold 3}.$ Hazard threshold 1 represents a critical gas concentration threshold that may result in a hazard such as combustion explosion; Hazard threshold 2 represents a critical pressure threshold that may result in pipeline rupture; and Hazard threshold 3 represents a critical temperature threshold that may result in a hazard such as combustion explosion.

In some embodiments, factors to consider may be more than or equal to the three factors. That is, in addition to considering the combustion explosion and pipeline rupture, there may be other practical considerations. Therefore, a risk component Ri may be set according to the actual situation. In some embodiments, ki may also be set based on a degree of danger of the risk. For example, when the risk of pipeline rupture is smaller than the risk of pipeline combustion explosion, k1 and k3 may be appropriately increased, and k2 may be adaptively decreased.

In some embodiments of the present disclosure, the smart gas pipeline network safety management platform may determine the maintenance risk degree through the risk degree assessment model based on the first feedback data and the second feedback data, which provides a more accurate assessment of risks in the maintenance process, so that the maintenance may be performed more safely.

In some embodiments, the input of the risk degree assessment model may also include a pre-maintenance risk. More descriptions regarding the pre-maintenance risk may be found in FIG. 2 and the related descriptions thereof.

In some embodiments, the pre-maintenance risk may be introduced into the input of the risk degree assessment model, which may take the pre-maintenance risk assessment into account and improve the accuracy of the model.

In some embodiments, the second cycle may be adjusted based on the first cycle according to the maintenance risk degree. For example, if the maintenance risk degree is high, the second cycle may be obtained by accordingly shortening a cycle length based on the first cycle.

In some embodiments, the second cycle may be determined in a more reasonable way by adjusting the second cycle based on the maintenance risk degree and the first cycle.

In 320, determining the maintenance parameter based on the maintenance risk degree and the data of the pipeline to be maintained.

In some embodiments, the smart gas pipeline network safety management platform may determine the maintenance parameter in various ways based on the maintenance risk degree and the data of the pipeline to be maintained. For example, the smart gas pipeline network safety management platform may determine the maintenance parameter by querying a fifth preset table based on the maintenance risk degree and the data of the pipe to be maintained. The fifth preset table is constructed based on the maintenance risk degree, historical maintenance pipeline data, and the maintenance parameter.

In some embodiments, the operation 320 may further include the operation 322, the operation 324, and the operation 326.

In 322, determining a candidate maintenance parameter based on the data of the pipeline to be maintained.

The candidate maintenance parameter refers to a maintenance parameter that serves as a candidate.

In some embodiments, the smart gas pipeline network safety management platform may determine the candidate maintenance parameter by querying a sixth preset table based on the data of the pipeline to be maintained. The sixth preset table may be constructed based on the historical maintained pipeline data and a historical maintenance parameter.

In 324, assessing a post-maintenance risk based on the data of the pipeline to be maintained and the candidate maintenance parameter.

The post-maintenance risk refers to a risk of fault of a gas pipeline assessed over a period of time after the gas pipeline is maintained based on the candidate maintenance parameter. For example, the post-maintenance risk may include a risk that the gas pipeline may fail again due to an external influence after the maintenance. The external influence includes an influence of a situation such as a large temperature change or a frequent of usage of a user.

In some embodiments, the smart gas pipeline network safety management platform may assess the post-maintenance risk based on the pipeline to be maintained data and the candidate maintenance parameter in various ways. For example, the post-maintenance risk may be assessed manually by a technician based on prior knowledge and historical experience. As another example, the post-maintenance risk may be assessed by a graph neural network model. More descriptions may be described in connection with FIG. 4 and FIG. 5.

In 326, determining a target maintenance parameter as the maintenance parameter based on the maintenance risk degree and the post-maintenance risk.

More descriptions regarding the maintenance risk degree may be found in the descriptions corresponding to the operation 310.

The target maintenance parameter refers to a preferred candidate maintenance parameter.

In some embodiments, the smart gas pipeline network safety management platform may determine the target maintenance parameter by sorting. For example, the maintenance risk degrees may be firstly compared and a candidate maintenance parameter with a smallest maintenance risk degree may be selected as the target maintenance parameter. If there is more than one candidate maintenance parameters, the post-maintenance risks may be compared and a candidate maintenance parameter with a smallest post-maintenance risk may be selected as the target maintenance parameter.

In some embodiments, the smart gas pipeline network safety management platform may also determine the target maintenance parameter through weighted summation based on the maintenance risk degree and the post-maintenance risk. For example, a maintenance parameter score may be calculated using the following equation:

Maintenance parameter score=k1*Maintenance risk degree+k2*Post-maintenance risk, where k1 and k2 denote preset weighting coefficients. After the calculation is completed, the candidate maintenance parameter with a high maintenance parameter score is selected as the target maintenance parameter. The target maintenance parameter may be determined as the maintenance parameter.

In some embodiments, the maintenance parameter is determined by calculating the maintenance parameter score through the weighted summation. The smart gas pipeline network safety management platform may select a maintenance parameter that is more in line with the actual situation by comprehensively considering the maintenance risk degree and the post-maintenance risk based on different weights.

In some embodiments of the present disclosure, the smart gas pipeline network safety management platform determines the candidate maintenance parameter based on the data of the pipeline to be maintained, assesses the post-maintenance risk, and determines the maintenance parameter based on the maintenance risk degree and the post-maintenance risk, which makes that the maintenance parameter is determined more logically and controls risks during and after the maintenance to a certain extent.

In some embodiments of the present disclosure, the smart gas pipeline network safety management platform determines the maintenance risk degree based on the first feedback data and the second feedback data and determines the maintenance parameter based on the maintenance risk degree and the data of the pipeline to be maintained, so that the feedback data in the maintenance process may be used as a reference for the maintenance parameter, and the maintenance parameter is more in line with the actual situation, thereby improving the accuracy of the maintenance parameter.

It should be noted that the descriptions of the process 300 are intended to be exemplary and illustrative only and does not limit the scope of application of the present disclosure. For those skilled in the art, various modifications and changes may be made to the process 300 under the guidance of the present disclosure.

Figure 4:
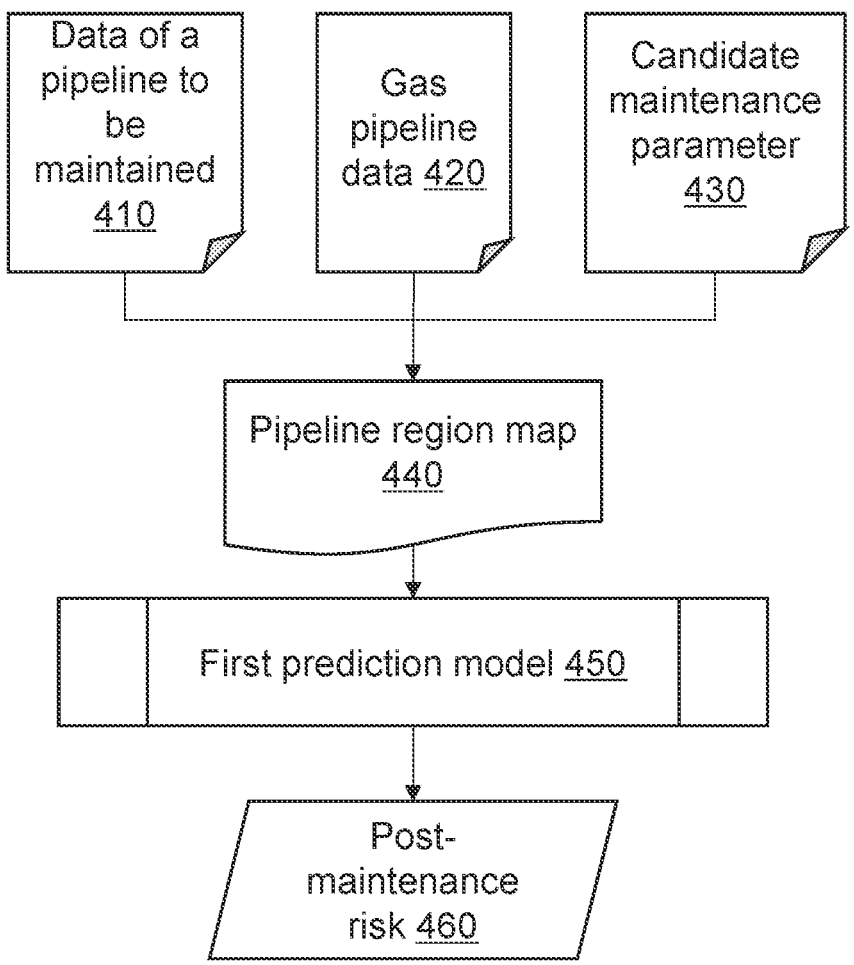
FIG. 4 is a schematic diagram illustrating determining a post-maintenance risk according to some embodiments of the present disclosure.

FIG. 4 is a schematic diagram illustrating determining a post-maintenance risk according to some embodiments of the present disclosure.

In some embodiments, a smart gas pipeline network safety management platform may determine, by obtaining gas pipeline data, a post-maintenance risk 460 based on data of a pipeline to be maintained 410, gas pipeline data 420, and a candidate maintenance parameter 430.

The gas pipeline data 420 refers to data related to a gas pipeline. For example, the gas pipeline data may include a pipeline feature, a pipeline environment feature, a historical pipeline maintenance situation, etc. The pipeline feature may include a pipeline usage frequency, a usage time distribution, a pipeline pressure feature, etc. The pipeline environment feature may include an aboveground/underground environment feature such as a temperature, a corrosion condition, or an atmospheric pressure/soil layer pressure.

In some embodiments, the smart gas pipeline network safety management platform may determine the post-maintenance risk 460 based on the data of a pipeline to be maintained 410, the gas pipeline data 420, and the candidate maintenance parameter 430 in various ways. For example, the smart gas pipeline network safety management platform may determine the post-maintenance risk by querying a seventh preset table based on the data of a pipeline to be maintained, the gas pipeline data, and the candidate maintenance parameter. The seventh preset table may be constructed based on the historical maintained pipeline data, the gas pipeline data, a historical maintenance parameter, and the post-maintenance risk.

In some embodiments, the smart gas pipeline network safety management platform may also construct a pipeline region map 440 based on the data of a pipeline to be maintained 410, the gas pipeline data 420, and the candidate maintenance parameter 430, and determine the post-maintenance risk 460 based on the pipeline region map.

The pipeline region map 440 may be used to reflect the distribution of pipelines in a preset region. The preset region may be a region set in advance. For example, a city may be divided into four regions of an east region, a west region, a south region, and a north region based on orientation. The pipeline region map of the east region of the city may be obtained based on the pipeline distribution in the east region of the city. A structure of the pipeline region map 440 may be seen in FIG. 5.

In some embodiments, the smart gas pipeline network safety management platform may construct the pipeline region map 440 based on the data of a pipeline to be maintained 410, the gas pipeline data 420, and the candidate maintenance parameter 430 as follows. The smart gas pipeline network safety management platform may determine a post-maintenance pipeline feature based on the data of a pipeline to be maintained 410 and the candidate maintenance parameter 430 and construct the pipeline region map 440 based on the post-maintenance pipeline feature and the gas pipeline data 420.

In some embodiments, the smart gas pipeline network safety management platform may determine the post-maintenance pipeline feature by performing vector matching in a third database based on the data of a pipeline to be maintained 410 and the candidate maintenance parameter 430.

In some embodiments, the smart gas pipeline network safety management platform may construct a vector to be matched based on the data of a pipeline to be maintained 410 and the candidate maintenance parameter 430. The third database includes a plurality of reference vectors. Each reference vector of the plurality of reference vectors corresponds to a post-maintenance pipeline feature.

In some embodiments, the smart gas pipeline network safety management platform may cluster data of a pipeline to be maintained and candidate maintenance parameters in the historical data and construct the plurality of reference vectors based on an obtained third clustering center set. Each clustering center corresponds to a reference vector. The reference vector is constructed in a similar way in which the vector to be matched is constructed.

In some embodiments, the smart gas pipeline network safety management platform matches the vector to be matched with the reference vectors, selects a reference vector whose similarity satisfies a third preset condition as a target vector, and determines a post-maintenance pipeline feature corresponding to the target vector as the post-maintenance pipeline feature. The third preset condition may be set according to a specific situation. For example, the condition may include the similarity is largest, the similarity is greater than a threshold, etc.

Figure 5:
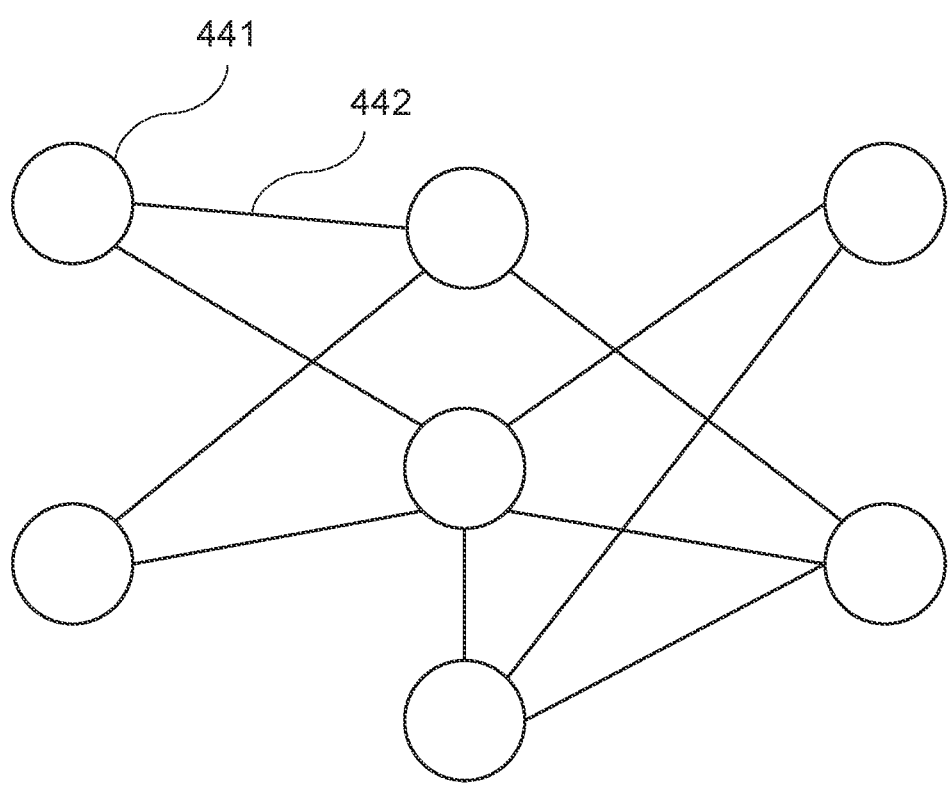
FIG. 5 is a schematic diagram illustrating a pipeline region map according to some embodiments of the present disclosure.

In some embodiments, as shown in FIG. 5, the pipeline region map 440 includes a node 441 and an edge 442. The node 441 may correspond to each pipeline in the preset region. A node feature may reflect a relevant feature of the corresponding pipeline. For example, the node feature may include a historical pipeline maintenance situation, a pipeline feature, a pipeline environment feature, and an estimated risk value. The historical pipeline maintenance situation may be obtained by querying the historical data. The pipeline feature and the pipeline environment feature may be found in the relevant descriptions of the gas pipeline data 420 in FIG. 4. The pipeline feature includes the post-maintenance pipeline feature. The estimated risk value refers to a risk that the pipeline may fail in the future.

As shown in FIG. 5, nodes that satisfy a connection condition may be connected through the edge 442. In some embodiments, the connection condition may include that there is a connected pipeline between the two nodes, or a distance between pipelines corresponding to the two nodes is smaller than a distance threshold. An edge feature of the edge may include a pipeline correlation coefficient, which may be determined based on the following equation:

pipeline correlation coefficient=a count of times two pipelines simultaneously fail in historical data/a sum of total counts of faults of each of the two pipelines.

In some embodiments, the smart gas pipeline network safety management platform may determine the post-maintenance risk 460 based on the pipeline region map 440 through a first prediction model 450.

In some embodiments, the first prediction model 450 may be a Graph Neural Network (GNN) model. In some embodiments, an input of the first prediction model 450 may be the pipeline region map 440. The first prediction model 450 may output the post-maintenance risk 460 of each pipeline based on the node of the pipeline region map 440.

In some embodiments, the first prediction model 450 may be obtained by training. For example, a second training sample may be a pipeline region map in the historical data, and a second label may be a risk situation determined by an eighth preset table based on a fault of a pipeline corresponding to the second training sample after maintenance. For example, if the pipeline bursts within a time period after the maintenance, the risk situation assessed based on the burst according to the eighth preset table may serve as the second label, and the eighth preset table may be preset by the technician based on historical experience. Exemplarily, the eighth preset table may be in the form of ([a1,b1], [a2,b2], . . . ), where a1, a2, . . . denote historical fault situations, b1, b2, . . . denote risk situations corresponding to the historical fault situations, and the risk situations corresponding to the historical fault situations involved in the pipeline region map serve as the second labels.

In some embodiments of the present disclosure, based on the data of a pipeline to be maintained 410, the gas pipeline data 420, and the candidate maintenance parameter 430, the pipeline region map 440 is constructed, and the post-maintenance risk 460 may be obtained by processing the pipeline region map 440 using the first prediction model 450, thereby making the prediction of the post-maintenance risk 460 more accurate and realistic.

In some embodiments, the smart gas pipeline network safety management platform may determine the estimated risk value based on the pipeline feature, the pipeline environment feature, and the maintenance parameter through a second prediction model.

In some embodiments, the second prediction model may be a machine learning model, e.g., a neural network model. An input of the second prediction model may include the pipeline feature and the pipeline environment feature. For a pipeline that has been maintained, the maintenance parameter may be added to the input. An output of the second prediction model may be the estimated risk value.

In some embodiments, the second prediction model may be obtained through training. For example, a third training sample may include a pipeline feature and a pipeline environment feature of a sample pipeline in historical data in a first historical time period. If the sample pipeline has been maintained, the maintenance parameter of the sample pipeline may be added to the input. A third label may be a risk value corresponding to the third training sample. The risk value of the third training sample may be determined based on a risk-related factor such as whether the sample pipeline fails, a fault type, and a degree of danger of fault in a historical time period. The second historical time period is later than the first historical time period.

For example, an actual risk value as the third label may be determined using the following equation:

estimated risk value=$k1$*Fault Type+$k2$*Pre-maintenance risk.

K1 and k2 are preset weighting coefficients. The relevant descriptions of the pre-maintenance risk may be found in FIG. 2.

In some embodiments of the present disclosure, the smart gas pipeline network safety management platform determines the estimated risk value based on the pipeline feature, the pipeline environment feature, and the maintenance parameter using the second prediction model, which improves the accuracy of the estimated risk value.

In some embodiments of the present disclosure, the smart gas pipeline network safety management platform determines the post-maintenance risk 460 based on the data of a pipeline to be maintained 410, the gas pipeline data 420, and the candidate maintenance parameter 430 and considers various aspects of the pipeline data, so that the obtained post-maintenance risk is more comprehensive and accurate, which is conducive to guiding the current maintenance work and effectively prevent gas pipeline faults.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, unless explicitly stated in the claims, the order of processing elements and sequences, the use of alphanumeric, or the use of other names described in the present disclosure is not intended to limit the order of the processes and methods of the present disclosure. While the above disclosure discusses some presently believed useful embodiments of the invention by way of various examples, it is to be understood that such details are for purposes of illustration only and that the appended claims are not limited to the disclosed embodiments, but on the contrary, the claims are intended to cover all modifications and equivalent combinations that come within the spirit and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this approach of disclosure does not imply that the features required by the present disclosure are more than the features recited in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each patent, patent application, patent application publication, and other material, such as article, book, specification, publication, document, etc., cited in the present disclosure is hereby incorporated by reference in its entirety. Historical application documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents of the present disclosure, the descriptions, definitions, and/or terms used in the present disclosure shall prevail.

Finally, it should be understood that the embodiments described in the present disclosure are only configured to illustrate the principles of the embodiments of the present disclosure. Other modifications are also possible within the scope of the present disclosure. Therefore, as an example and not a limitation, alternative configurations of the embodiments of the present disclosure may be regarded as consistent with the teaching of the present disclosure. Correspondingly, the embodiments of the present disclosure are not limited to the embodiments clearly introduced and described in the present disclosure.

What is claimed is:

1. An Internet of Things (IoT) system for smart gas pipeline maintenance based on human-machine linkage, comprising a smart gas user platform, a smart gas service platform, a smart gas pipeline network safety management platform, a smart gas pipeline network sensor network platform, and a smart gas pipeline network object platform, wherein the smart gas pipeline network safety management platform is configured to:
    determine a first cycle based on data of a pipeline to be maintained, a feature of a maintainer, or a feature of a maintenance robot;
    obtain, through a maintainer terminal or the maintenance robot, first feedback data based on the first cycle;
    determine, based on the first feedback data and the data of the pipeline to be maintained, a maintenance parameter and send the maintenance parameter to the maintainer terminal; wherein the maintenance parameter refers to work that the maintainer needs to complete and work that needs to be completed by controlling the maintenance robot; the maintenance parameter is related to second feedback data, the second feedback data being obtained by the maintenance robot according to a second cycle; and
    the smart gas pipeline network safety management platform is further configured to:
    determine a maintenance risk degree based on the first feedback data and the second feedback data; wherein the maintenance risk degree refers to a risk change value of a maintenance parameter in a current maintenance process compared with before the maintenance process;
    determine the maintenance parameter based on the maintenance risk degree and the data of the pipeline to be maintained; and
    generate, based on the maintenance parameter, a control instruction and send the control instruction to the maintenance robot.

2. The IoT system according to claim 1, wherein the smart gas pipeline network safety management platform is further configured to:
    determine a fault level based on the data of the pipeline to be maintained; and
    determine a pre-maintenance risk based on the fault level and the first feedback data.

3. The IoT system according to claim 1, wherein the smart gas pipeline network safety management platform is further configured to:
    determine a candidate maintenance parameter based on the data of the pipeline to be maintained;
    assess a post-maintenance risk based on the data of the pipeline to be maintained and the candidate maintenance parameter; and
    determine a target maintenance parameter as the maintenance parameter based on the maintenance risk degree and the post-maintenance risk.

4. The IoT system according to claim 3, wherein the smart gas pipeline network safety management platform is further configured to:
    determine the post-maintenance risk based on the data of the pipeline to be maintained, gas pipeline data, and the candidate maintenance parameter.

5. A method for smart gas pipeline maintenance based on human-machine linkage, implemented by a smart gas pipeline network safety management platform of an Internet of Things (IoT) system for smart gas pipeline maintenance based on human-machine linkage, wherein the method comprises:
    determining a first cycle based on data of a pipeline to be maintained, a feature of a maintainer, or a feature of a maintenance robot;
    obtaining, through a maintainer terminal or the maintenance robot, first feedback data based on the first cycle;
    determining, based on the first feedback data and the data of the pipeline to be maintained, a maintenance parameter and sending the maintenance parameter to the maintainer terminal; wherein the maintenance parameter refers to work that the maintainer needs to complete and work that needs to be completed by controlling the maintenance robot; the maintenance parameter is related to second feedback data, the second feedback data being obtained by the maintenance robot according to a second cycle; and the method further comprises:

determining a maintenance risk degree based on the first feedback data and the second feedback data; wherein the maintenance risk degree refers to a risk change value of a maintenance parameter in a current maintenance process compared with before the maintenance process;

determining the maintenance parameter based on the maintenance risk degree and the data of the pipeline to be maintained; and generating, based on the maintenance parameter, a control instruction and sending the control instruction to the maintenance robot.

6. The method according to claim 5, further comprising:
determining a fault level based on the data of the pipeline to be maintained; and
determining a pre-maintenance risk based on the fault level and the first feedback data.

7. The method according to claim 5, wherein the determining the maintenance parameter based on the maintenance risk degree and the data of the pipeline to be maintained includes:

determining a candidate maintenance parameter based on the data of the pipeline to be maintained;

assessing a post-maintenance risk based on the data of the pipeline to be maintained and the candidate maintenance parameter; and determining a target maintenance parameter as the maintenance parameter based on the maintenance risk degree and the post-maintenance risk.

8. The method according to claim 7, wherein the assessing a post-maintenance risk based on the data of the pipeline to be maintained and the candidate maintenance parameter includes:

determining the post-maintenance risk based on the data of the pipeline to be maintained, gas pipeline data, and the candidate maintenance parameter.

* * * * *